UNITED STATES PATENT OFFICE.

HENRY AKERMAN DESMOND COLLINS, OF LONDON, ENGLAND.

REFRACTORY MATERIAL.

982,252.     Specification of Letters Patent.     Patented Jan. 24, 1911.

No Drawing.     Application filed July 8, 1907. Serial No. 382,770.

*To all whom it may concern:*

Be it known that I, HENRY AKERMAN DESMOND COLLINS, a subject of the King of Great Britain, residing at Savoy Court, Strand, London, England, have invented new and useful Improvements in and Relating to Refractory Materials; and I do hereby declare that the following is a full, clear, and exact description of the invention, which will enable others skilled in the art to which it appertains to make and use the same.

This invention relates to improvements in the manufacture of refractory materials capable of resisting high temperatures and is adapted for use in the production of articles such as retorts, crucibles, bricks and blocks, and as a lining for furnaces and the like.

In the specification of my former Patent No. 826,763 I described the use of viscous sodium silicate of a density of say 140 Tw., for use in the manufacture of refractory material. I have now discovered that I can produce greatly improved results by the use of a powdered solid silicate or water glass.

According to my present invention I mix pulverized quartz, silver or sea sand or other equivalent material with powdered water glass in suitable proportions. These materials are thoroughly incorporated with the addition of sufficient steam or hot water to form a thorough plastic mass. The mixture still in a heated plastic state is submitted to pressure in suitable molds to form bricks, crucibles, retorts, or other desired articles, and burned at a high temperature, say above 1500° C., in the case of say bricks or blocks. The quantity of water glass which I use is usually from about 3 to 6% of the mass by weight. I may incorporate with the mixture if desired, a small proportion of lime or other suitable calcium compound, alkaline, or alkaline earth material. The articles when molded under pressure may be taken direct to the kiln without preliminary drying provided that the proportion of added water be only sufficient to produce coherent articles under pressure.

The material above described, with or without admixture with other suitable substances, forms an excellent lining for furnaces. In this case the powdered mixture of silica and water glass may be used in proportions varying from 90% silica, 10% water glass to 99% silica and 1% water glass.

Having now particularly described and ascertained the nature of my said invention and in what manner the same is to be performed, I declare that what I claim is:—

1. The process of manufacturing refractory articles or material consisting in mixing pulverized silicious matter and powdered water glass with heat and moisture to produce a plastic mass and then molding the mass while in a heated state under pressure, and immediately burning it at a high temperature, substantially as described.

2. The process of manufacturing refractory articles or material consisting in mixing silicious matter and powdered water glass and alkaline material with heat and moisture to produce a plastic mass then molding the mass while in a heated state under pressure and immediately burning at a high temperature, substantially as described.

3. The process of manufacturing refractory articles or material consisting in mixing silicious matter and powdered water glass and alkaline material with heat and moisture to produce a plastic mass, then molding the mass while in a heated state under pressure and immediately burning at a temperature of not less than 1500° C., substantially as described.

HENRY AKERMAN DESMOND COLLINS.

Witnesses:
H. D. JAMESON,
F. L. RANDS.